June 10, 1952   W. F. BRUNDAGE ET AL   2,600,201
GRAPH DUPLICATION
Filed Feb. 28, 1951
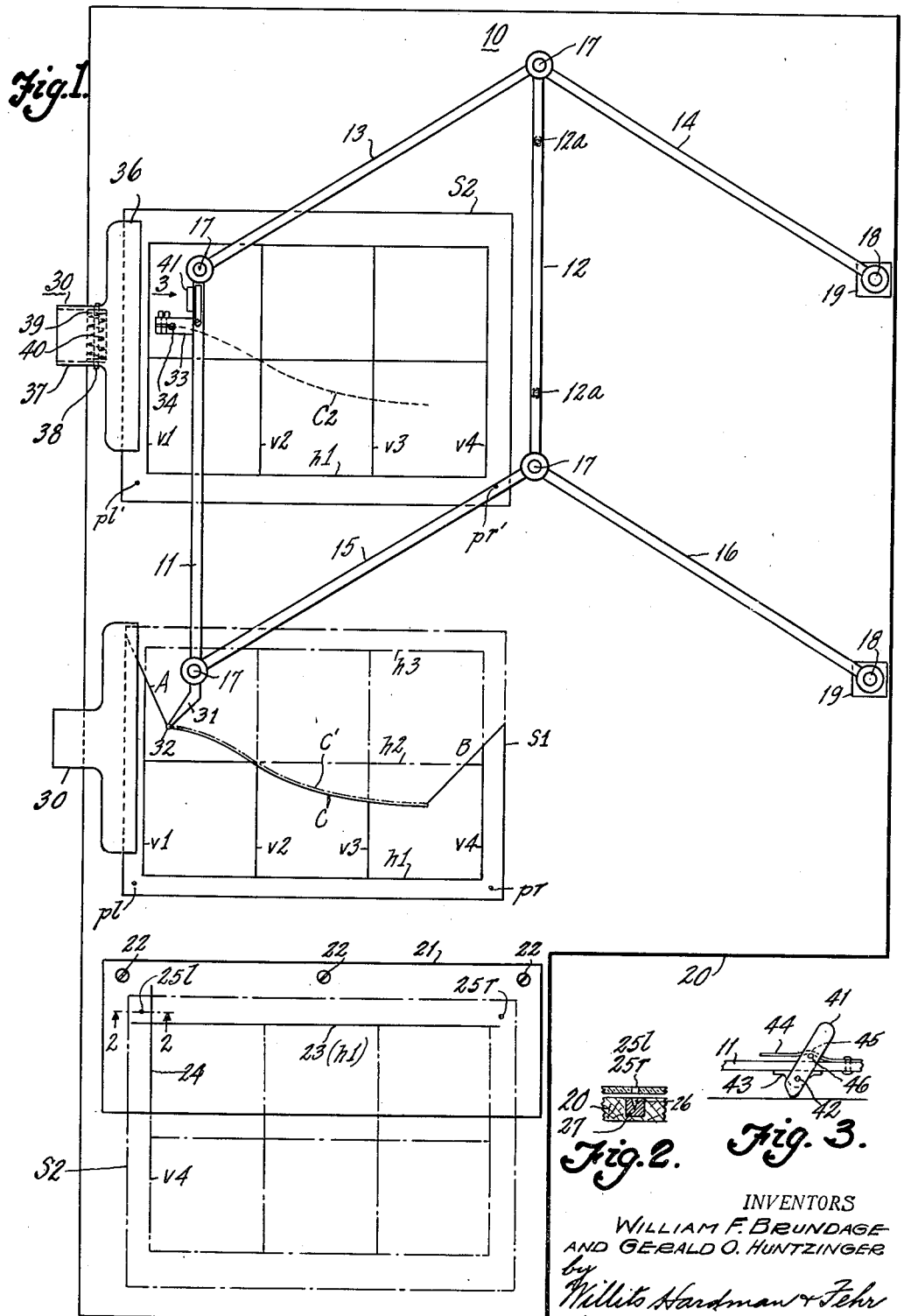
INVENTORS
WILLIAM F. BRUNDAGE
AND GERALD O. HUNTZINGER
by Willits, Hardman & Fehr
their ATTORNEYS Patented June 10, 1952

2,600,201

UNITED STATES PATENT OFFICE 2,600,201

GRAPH DUPLICATION

William F. Brundage and Gerald O. Huntzinger, Anderson, Ind., assignors to General Motors Corporation, Detroit, Mich., a corporation of Delaware Application February 28, 1951, Serial No. 213,086

2 Claims. (Cl. 33—25)

This invention relates to the art of duplicating curves on printed graph paper from a master curve drawn on like printed graph paper.

An object of the invention is to provide a method and apparatus by which a pantograph can be used for duplicating, upon a duplicate sheet, a curve drawn on a master sheet and more particularly to effect registration of the graph cross lines printed on the duplicate sheet with those printed on the master sheet so that the duplicate curve on the duplicate sheet will intersect its cross lines at points corresponding to the points on the cross lines of the master sheet which are intersected by the curve on the master sheet.

The method of the present invention involves the use of a duplicating pantograph having a link whose positions are in parallelism for all positions of the pantograph, said link providing for the support of a duplicating pen and a stylus. The method comprises mounting the sheet bearing the graph line upon a stiff, thin backing sheet, removing from these attached sheets a portion sufficient to leave a stylus-engaging edge coincident with one margin of the graph line thus providing a template, punching locating holes in the template in predetermined relation to the base line printed on the template, placing the template on the board with the template holes registering with pins projecting from the board and so positioned as to locate the template base line at right angles to the said link, providing the sheet on which the graph line is to be duplicated with holes located in a relation to the base line of said sheet which is the same as the relation between the template holes and the template base line, placing the duplication sheet upon the board in registry with other pins projecting from the board and positioned to locate said duplication sheet in a position such that its base line will be at right angles to said pen-carrying link and that the starting point of the pen carried by said link will be in a relation to the base line of the duplication sheet which is the same as the relation between the starting central point of the original graph and the base line of the template and, while the pen engages the duplication sheet moving along and in engagement with said template edge a stylus carried by said link and having a template-edge-engaging cylindrical surface whose diameter is substantially equal to the width of the original graph line.

Further objects and advantages of the present invention will be apparent from the following description, reference being had to the accompanying drawings wherein a preferred embodiment of the present invention is clearly shown.

In the drawings:

Fig. 1 is a plan view of apparatus embodying the present invention.

Fig. 2 is an enlarged scale view on line 2—2 of Fig. 1.

Fig. 3 is an enlarged fragmentary side view looking in the direction of arrow 3 of Fig. 1.

Referring to the drawings a pantograph 10 includes six links 11, 12, 13, 14, 15 and 16 of equal length pivotally connected by pivot pins 17. Links 14 and 16 are connected by pivot pins 18 with plates 19 attached to a board 20. Pins 18 are in vertical alignment on board 20. The pantograph links 11 and 12, which appear vertical in Fig. 1, will be vertical in any position of the pantograph. Link 12 carries pins 12a which engage the board 20 so as to support the central part of the pantograph.

The original graph line which is to be duplicated is first drawn on a sheet of graph paper on which a number of horizontal and vertical lines are printed as indicated by reference characters $h1$, $h2$, $h3$, $v1$, $v2$, $v3$ and $v4$. Sheet S1 is fastened to a back sheet of stiff paper or other suitable thin material and both sheets are cut on lines A and B and along the lower marginal edge C of the original graph line. The upper margin of the graph line is indicated by curve C' in dot-dash lines. The spacing between curves C and C' represents the width of the graph line drawn upon sheet S1, the actual center of the graph line being midway between curves C and C'. The portion of sheet S1 and its backing sheet above lines A, B and C represented by the vertical and horizontal dot-dash lines is discarded.

Sheet S1 is then placed upon board 20 and underneath a transparent, punch template plate 21 secured to the board by screws 22. Plate 21 has a horizontal line 23 and a vertical line 24. Plate 21 has two punch guiding, template holes 25$l$ and 25$r$ which, as shown in Fig. 2, are in alignment with punch receiving sockets 26 each in a metal insert 27 embedded in board 20. The holes 25$l$ and 25$r$ are located the same distance vertically above the line 23. The hole 25$l$ is located at a certain distance to the left of line 24 and is in horizontal alignment with the hole 25$r$. Sheet S1 is moved so that its base line $h1$ will be in alignment with line 23 and its vertical line $v4$ in alignment with line 24. While this alignment is maintained by pressing down plate 21, a punch is passed through each of the holes 25*l* and 25*r* to make holes in the sheet S1 in registry with these template holes.

The master sheet S1 is then placed upon pointed pins *pl* and *pr*, pin *pl* receiving the hole aligned with hole 25*r* and pin *pr* receiving the hole aligned with hole 25*l*. Pins *pl* and *pr* are in horizontal alignment and horizontally spaced a distance equal to the horizontal spacing of holes 25*l* and 25*r*. Therefore, base line *hl* bears the same relation to pins *pl* and *pr* as lines 23 and 24 bear to the holes 25*l* and 25*r* of plate 21. The master sheet S1 is retained in this position by a spring actuated clamp 30.

There are two locating pins *pl'* and *pr'* in horizontal alignment and spaced apart the horizontal distance between pins *pl* and *pr* and template holes 25*l* and 25*r*. Pins *pl'* and *pr'* are in vertical alignment, respectively, with pins *pl* and *pr* and are spaced vertically therefrom a distance equal to the vertical distance between a stylus 32 carried by an arm 31 of link 11 and a pen 34 carried by a holder 33 attached to link 11. The stylus 32 and the pen 34 are spaced horizontally from the center line of link 11 the same distance.

The graph sheet upon which a duplicate curve is to be drawn is marked S2. Sheet S2 is pierced with registering holes in the same manner as sheet S1. Sheet S2 is inverted, as indicated by the dot-dash lines, at the lower part of Fig. 1 and its base line *hl* is placed directly under line 23 of plate 21 and its right-hand vertical line v4 directly under line 24. The prick punch is passed through the holes 25*l* and 25*r* and sheet S2 is placed with its base line *hl* down upon the board with its holes receiving pins *pl'* and *pr'*. Sheet S2, shown in full lines in the upper part of Fig. 1, is held in this position by another clamp 30. Each clamp 30 is a conventional paper pad holder comprising a paper engaging blade 36 extending from a push down handle 37 which is pivotally supported by rod 38 extending through ears of a bracket 39 and surrounded by a spring 40 which urges the blade 36 toward the board 20. The location of pins *pl* and *pr* is such that they are on a line at right angles to the center line of link 11 and the vertical location of these pins is such the stylus 32 can conveniently engage the template edge C. The location of pins *pl'* and *pr'* is such that they are on a line at right angles to the center line of link 11 and so that the starting point of pen will bear a relation to the base line *hl* of sheet S2 which is the same as the relation of the starting point of stylus 32 with respect to the base line *hl* of template sheet S1. That is, at the starting positions of pen 34 and stylus 32, the center of pen 34 is at a distance above line *hl* of sheet S2 equal to the distance of the center of stylus 32 above the line *hl* of sheet S1; and the center of pen 34 is at a distance horizontally from line v1 of sheet S2 equal to the distance horizontally between the center of stylus 32 and line v1 of sheet S1.

The stylus 32 has a template-edge-engaging cylindrical surface whose diameter is substantially equal to the width of the original graph line drawn on the master sheet S1. This diameter is equal to the distance between the curves C and C' considering these lines to have zero width. Therefore, the center of the stylus 32 will track the center of the graph line which was originally drawn on sheet S1.

The lower end of pen 34 is normally above the duplicate sheet S2. It is held in this position by a lever 41 pivotally supported by a pin 42 (Fig. 3) supported by a bracket 43 attached to the under side of the link 11. Lever 41 is retained in the position shown in Fig. 3 by a spring 44 which is bent at 45 to receive a pin 46 extending from lever 41. When lever 41 is moved counterclockwise, as shown in Fig. 3, pen 34 will be lowered upon sheet S2. This is done after the stylus 32 has been placed in engagement with the left end of, or starting point of the edge C of template sheet S1. As the pantograph is manipulated so that the stylus 32 is maintained in engagement with the template edge C, the pen 34 marks, upon the duplication sheet S2, a curve C2 the center line of which is a duplicate of the center line of the graph line originally drawn on sheet S1. If, for example, the width of the graph line originally drawn on sheet S1 is .015 inch, the diameter of the cylindrical, template-edge-engaging surface of the stylus 32 is .015 inch. The ink line C2 should, of course, be as narrow as possible to obtain with an inking pen; but its exact width is inconsequential since the center line of curve C2 is a duplicate of the center line of the original graph curve.

After completing the inking of line C2 on duplication sheet S2, lever 41 is moved again to the position shown in Fig. 3 so that the pen is lifted from sheet S2 and the pantograph is moved to the right to clear sheet S2 which is removed and replaced by another one which has been provided with holes for registration with pointed pins *pl'* and *pr'*. This process is repeated to provide as many duplicate curve sheets as are required. The same or other curve sheets can be processed using other master sheets in place of the one shown. If different curves are to be drawn on the same duplication sheet, these curves may be shown in different colors. The term "pen" used herein includes any equivalent marking instrument.

While the embodiment of the present invention as herein disclosed, constitutes a preferred form, it is to be understood that other forms might be adopted.

What is claimed is as follows:

1. The method of duplicating, on a printed graph sheet, a graph line drawn on a like printed graph sheet by the use of a duplicating pantograph having a link whose positions are in parallelism for all positions of the pantograph, said link providing for the support of a duplicating pen and a stylus, said method comprising mounting the sheet bearing the graph line upon a stiff, thin backing sheet, removing from these attached sheets a portion sufficient to leave a stylus-engaging edge coincident with one margin of the graph line thus providing a template, punching locating holes in the template in predetermined relation to the base line printed on the template, placing the template on the board with the template holes registering with pins projecting from the board and so positioned as to locate the template base line at right angles to the said link, providing the sheet on which the graph line is to be duplicated with holes located in a relation to the base line of said sheet which is the same as the relation between the template holes and the template base line, placing the duplication sheet upon the board in registry with other pins projecting from the board and positioned to locate said duplication sheet in a position such that its base line will be at right angles to said pen-carrying link and that the starting point of the pen carried by said link will be in a relation to the base line of the duplication sheet which is the same as the relation between the starting central point of the original graph and the base line of the template and, while the pen engages the duplication sheet, moving along and in engagement with said template edge a stylus carried by said link and having a template-edge-engaging cylindrical surface whose diameter is substantially equal to the width of the original graph line.

2. Apparatus for duplicating, on a printed graph sheet, a graph line drawn on a like-printed master graph sheet, comprising a board, a pantograph mounted for movement upon the board and including articulated links one of which has positions which are in parallelism for all positions of the pantograph, a stylus and a pen carried by said one link, a punch template plate of transparent material under which the master graph sheet and the duplication sheets are successively placed, said template plate bearing lines at right angles under which the base line and a vertical line of the printed sheet are placed, said template plate having punch guide holes located in a certain relation to said lines on the template plate for the location of holes in the sheets in said certain relation to their base lines, a first set of pins projecting from the board for receiving the holes of the master sheet, said pins being so located as to locate the master sheet base line at right angles to the center line of the stylus-carrying link, said master sheet having been attached to a stiff backing sheet and portions of these attached sheets having been removed to provide a template edge coincident with one margin of the original graph line, a second set of pins projecting from the board for receiving the holes of the duplication sheet, said second set of pins being located so as to position the duplication sheet with its base line at right angles to the center line of the pen-carrying link and so that, when the stylus engages the starting point of template edge, the relation of the center of the pen to the base line of the duplication sheet will be the same as the relation of the center starting point of the original graph line with respect to the base line of the master sheet, the stylus having a cylindrical, template-edge-engaging surface whose diameter is substantially equal to the width of the original graph line.

WILLIAM F. BRUNDAGE.
GERALD O. HUNTZINGER.

No references cited.